(12) United States Patent
Cook

(10) Patent No.: US 6,168,517 B1
(45) Date of Patent: Jan. 2, 2001

(54) RECIRCULATING AIR MIXER AND FAN WITH LATERAL AIR FLOW

(76) Inventor: E. F. Cook, 5858 Mt. Alifan Dr. #200, San Diego, CA (US) 92111

(*) Notice: Under 35 U.S.C. 154(b), the term of this patent shall be extended for 0 days.

(21) Appl. No.: 09/429,793

(22) Filed: Oct. 29, 1999

(51) Int. Cl.[7] .................................................. F24F 7/007
(52) U.S. Cl. .............................. 454/269; 55/467; 55/471; 454/292; 454/302; 454/303
(58) Field of Search .................................. 454/228, 230, 454/231, 233, 234, 236, 269, 292, 302, 303, 324, 338; 55/385.2, 467, 471

(56) References Cited

U.S. PATENT DOCUMENTS 2,313,676 * 3/1943 Shaver .............................. 454/269 X
3,760,708 * 9/1973 Burup ................................ 454/269 X

* cited by examiner

Primary Examiner—Harold Joyce
(74) Attorney, Agent, or Firm—Brown Martin Haller & McClain LLP

(57) ABSTRACT

An air circulation and mixing device is disclosed which can cover a ceiling air ventilation duct, taking air discharged from the duct and drawing air at the room's ceiling, mixing the two, and redirecting the mixed air so that it is discharged radially and parallel to the ceiling, rather than directly downwardly. The device has an open frame whose sides may be covered with removable air filtration media and which forms a primary interior having a lower aperture and normally an upper aperture. An open-sided grille below the lower aperture forms a secondary space. A fan is mounted within the primary space and turns blades within the lower aperture and a disk at the bottom of the secondary space. An annular plate surrounding the fan housing blocks downward flow of incoming air and forces the air to flow radially outwardly around the edge of the plate, thus also insuring good mixing with the incoming ceiling air. The rotating disk receives air blown downwardly through the lower aperture and redirects it radially outwardly through the openings in the side of the grille, such that airflow becomes horizontal and parallel to the ceiling, so that the air flow slows and the air becomes gradually dispersed throughout the entire room. The device can also be mounted over a through-wall air duct outlet by using a duct extension.

22 Claims, 3 Drawing Sheets

RECIRCULATING AIR MIXER AND FAN WITH LATERAL AIR FLOW

BACKGROUND OF THE INVENTION

1. Field of the Invention

The invention herein relates to air movement and circulation devices such as fans, mixers and blowers. More particularly it relates to such devices for mixing and direction of air from ventilation systems and within confined spaces such as rooms in homes or offices.

2. Description of the Prior Art

In most offices, stores, restaurants and similar buildings air ventilation is obtained through forced air ducts in the ceiling which carry high-volume air streams, with the air being heated or cooled according to the season of the year and the activity occurring in that ventilated portion of the building. The same type of system is used in many homes and apartments, but the volume of airflow is generally less.

As anyone knows who has had the misfortune to have been seated at a desk or table directly underneath a ventilating duct, being subjected to direct flow of heated or cooled air can be quite uncomfortable. While in some cases it may be possible to move away from the airflow (such as by asking for another table at a restaurant), there are many situations where people are unable to move to another location (such as when one's assigned desk in a office happens to be located underneath a ventilation duct). Similar problems were encountered where a ceiling vent was positioned above one side of a doorway.

In the past the only way to redirect ceiling discharge airflow was to cover the ventilation opening with a louvered grille, of which there have been many which allow for a least some adjustment of the angle of the louvers so that air could be at least partially directed away from the person sitting directly underneath the vent. Such grills have had some success, but often are not an effective solution, because they tend merely to redirect the airflow to a neighboring location. Thus as one office worker changes the angle of the louvers to direct the air away from him or her, all that often does is to direct the air toward the person sitting at the next desk.

In addition, many of the downwardly directed air vents have little effect in mixing the air in an office, restaurant or other similar large enclosure. Discharged air is forced rapidly toward the floor, while at the ceiling level a stagnant layer of air often exists. Merely redirecting the louvers often has no significant effect, since with most louvered grills the effect of changing the angle of the louvers very far away from directly downward is to largely block the air flow altogether.

SUMMARY OF THE INVENTION

I have now developed a new type of air circulation and mixing device which solves both of these problems. This device, which is normally installed covering the outlet of a ceiling air ventilation duct, takes the air being discharged from the duct, draws in air from the layer at the room's ceiling, mixes the two, and redirects the mixed air so that it is discharged into the room or other enclosed space radially and parallel to the ceiling, rather than directly downwardly. Thus the stagnant layer of air at the ceiling is eliminated and at the same time the high-volume ventilation air coming from the ventilation duct is redirected to flow parallel to the ceiling and only gradually disperse downwardly into the room, in a manner which does not create a strong draft of air which is uncomfortable to persons working, dining or engaged in other activities in that room.

My device, which can be considered to be a fan designed to mix bodies of air and discharge them radially around the edge of the fan, is formed with an open frame which may be circular or polygonal (such as the octagonal shape shown in the Figures). This open frame has open sides which can be covered with removable air filtration media, so that the stagnant layer of ceiling air, when drawn in by the fan, must pass through these filter media and be cleaned of contaminants such as particulate material before being mixed with the ventilation air and re-distributed throughout the room. There is a hollow "primary" interior space formed by the side walls of the frame and a frame bottom plate with a central aperture. Mounted below the bottom plate and covering the central aperture is an annular open-sided grille, forming a "secondary" interior space within the grille annulus, with a circular second aperture defined by the lower edge of the grille. At the top of a frame is either a mounting plate or an "insertion plate" which has a protruding collar to allow the device to be inserted into the outlet end of a ventilation duct to insure that the ventilation air is all channeled into the device.

Suspended and mounted within the primary interior space is a motorized fan driven by an electric motor which rotates a motor shaft which extends from the motor. Also within the primary interior space is an annular radial plate, normally surrounding the fan motor housing and preferably attached to it. This plate extends outwardly a distance sufficient into the airflow path from the ventilation duct to block most of the downward flow of the air and force the air to flow outwardly around the edge of the plate, thus also insuring good mixing with the incoming ceiling air. A small portion of the downwardly flowing air from the duct vent can be allowed to flow past the fan housing to provide cooling to the fan motor.

The fan motor is disposed within the primary interior space such that the motor shaft projects vertically downwardly through the central aperture of the bottom plate of the frame and through the secondary interior space formed within the grille structure, to terminate at the lower aperture. Mounted on the motor shaft at the point where the shaft passes through the central aperture is a set of fan blades, which rotate within that central aperture. The fan blades are set at the appropriate angle such that they draw air from above the horizontally disposed blades and force it downwardly past the blades. Also mounted on the motor shaft, but at the end which is distal from the motor, is a solid thin circular plate which is positioned within the lower aperture and rotates with the fan blades and motor shaft. The air projected downwardly from the fan blades is redirected by this plate and projected radially outwardly through the openings in the side of the grille, such that the airflow becomes horizontal and parallel to the ceiling of the room. As the air rapidly moves outwardly parallel to the ceiling, the air flow slows and the air becomes disbursed throughout the entire room. However, that dispersion is gradual and does not create any strong air currents which would be uncomfortable to those people within the room.

This device therefore eliminates many problems which are commonly associated with forced air ventilation, in that it prevents strong down drafts, eliminates stagnant air pockets, encourages mixing of layers of air throughout the height of a room, and eliminates a source of complaints by people who are currently subjected to uncomfortable airflows from prior art air discharge systems.

It will be evident from the description herein that my device also functions quite effectively even when there is no air flow coming from the ventilation system, in that the device continues to draw in the ambient air at the ceiling and recirculate it out parallel to the ceiling but in the direction opposite the intake. This effectively mixes the ceiling layer and causes the recirculated air to disperse throughout the room. Thus operation of the device is contemplated as positioned over a vent, but where air flow in the ventilation system may cycle on and off, so that airflow through the vent will be intermittent, and also where the device is not positioned over a vent at all, but serves entirely to recirculate, mix and disperse ambient ceiling air. Applications of these operational embodiments can be, for instance, in a large room such as a big restaurant dining room, a large office or workspace, or the like, where one or more air vents discharge from the ceiling, but their spacing is greater than the optimum spacing of the present devices. Some of the devices can then be placed over the existing vents, and others of the devices can be placed at intervals between them, but not over vents, so that the net result is that vented air is mixed with ceiling air and distributed radially parallel to the ceiling, but also at the intermediate device locations the remaining portions of the ceiling air are also adequately mixed and dispersed.

Therefore, in a broad embodiment, the invention herein involves an air circulation device comprising an open frame defining a first open space having a top, an open side and a bottom and a second open space below the bottom and having an open side and a bottom, and an aperture through the bottom between the first and the second open spaces; a fan motor disposed in the first open space, a motor shaft of the fan motor extending outwardly from the motor through the aperture into the second open space; and fan blades mounted on the shaft at a point intermediate thereof and a disk mounted on the shaft and an end thereof distal to the fan motor; such that when the motor is activated, the blades and the disk rotate, the blades draw air into the first open space through at least the open side of the first open space and discharge the air through the aperture into the second open space, and the disk in the second open space causes the air to discharge radially from the second space through the side thereof, the discharged air thereby flowing parallel to the air being drawn into the first open space through the side thereof, but in a direction opposite thereto, the device thereby causing mixing and dispersion of the air into ambient space surrounding the device without downdrafts. In a preferred extension of this embodiment, the device further comprises a second aperture in the top of the first open space, for entry of air into the first open space other than through the side of the first open space.

In another broad embodiment, the invention involves an air circulation device for use with an air flow ventilation system, the device comprising a frame comprising at least one surrounding side and a bottom, each of the side and the bottom having at least one respective aperture therein for air flow, the side and bottom together defining a first interior; a grille attached to the bottom around the opening therein and projecting from the bottom outwardly from the first interior, the projection defining a second interior, the grille having at least one aperture in a side thereof for air flow; a fan disposed in the first interior and supported by the frame, the fan comprising a motor having a motor shaft projecting through the aperture in the bottom and into the second interior, fan blades mounted on the shaft and a solid disk mounted at an end of the shaft distal from the motor; an airflow diverter disposed across a portion of the first interior; and a top of the frame comprising securing means for securing the device across an outlet of an air ventilation duct, the top having an opening therein for alignment with the outlet of the duct and providing air passage from the duct into the first interior; whereby when the motor is operated to rotate the shaft, fan blades and disk, the fan blades draw air from ambient surrounding space through the side of the frame into the first interior, the diverter causes air discharged from the vent and entering the first interior through the aperture in the top to diverge from a straight flow path, the fan blades and diverter thus causing ambient and vent air to intermix, the blades project intermixed air through the aperture in the bottom and against the plate, and rotation of the plate causes substantially all of the intermixed air to be projected radially through the aperture in the side of the grille. In a preferred embodiment, the invention further comprises an air filtration medium covering at least one opening in the side of the frame, such that the air drawn into the first interior by the fan blades passes through the air filtration medium for filtration of contaminants therefrom.

Other embodiments configurations and applications will be evident from the description below.

DETAILED DESCRIPTION AND PREFERRED EMBODIMENTS

Figure 7:
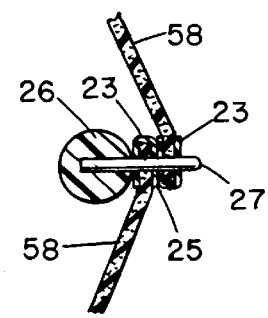
FIG. 7 is an enlarged section view taken on Line 7—7 of FIG. 5.

The invention is best understood by reference to the drawings. For clarity in discussion, it will be assumed unless otherwise stated that the device of this invention is disposed horizontally attached to a ceiling, i.e., in the orientation shown in FIGS. 1 and 3–5, so that the fan blades 50 and disk 54 rotate in a substantially horizontal plane. Vertical orientation is exemplified by attachment to a wall, as will be discussed below with reference to FIG. 7. "Downwardly" and "upwardly" will be with respect to horizontal orientation.

Figure 1:
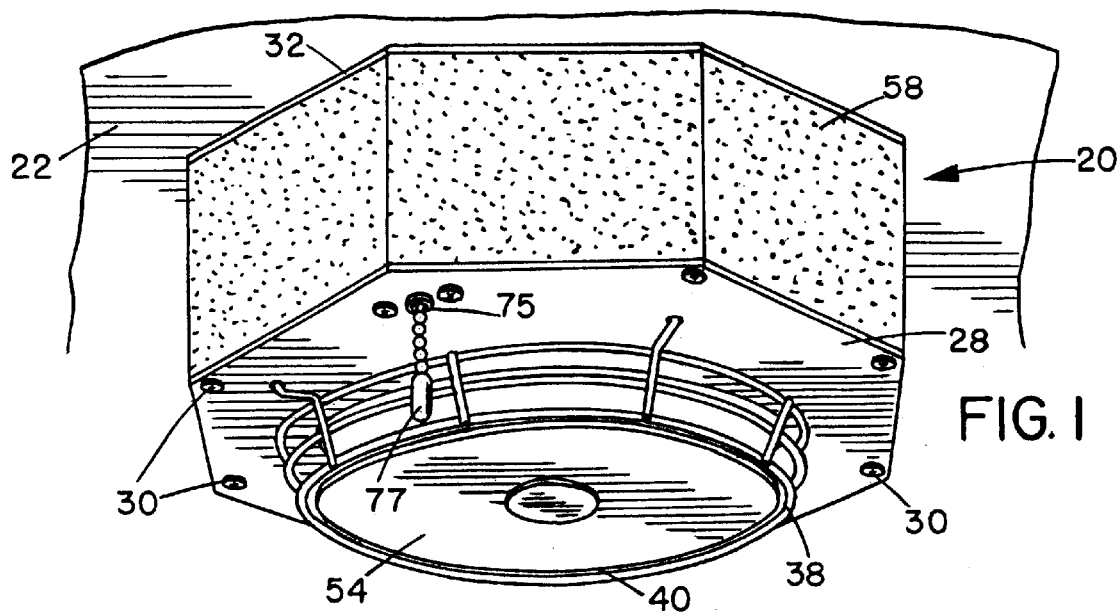
FIG. 1 is a perspective view from below of a compete unit of the device of the present invention.
Figure 2:
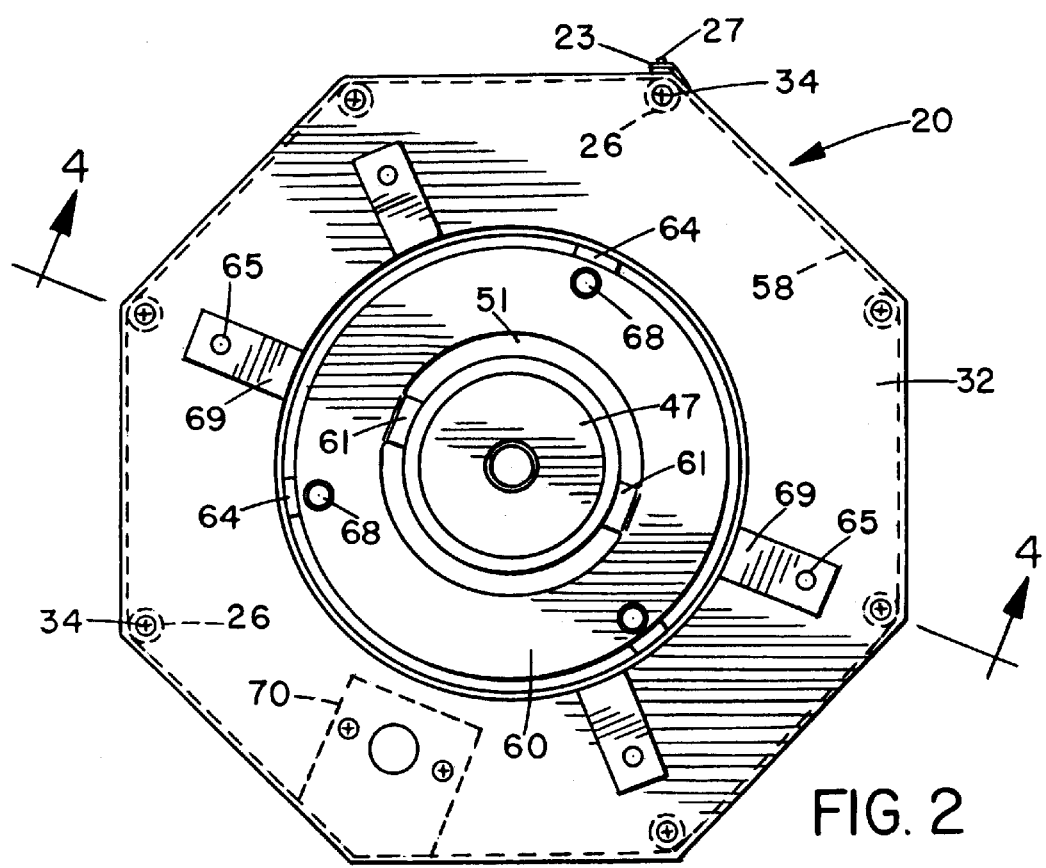
FIG. 2 is a top plan view of the device.
Figure 4:
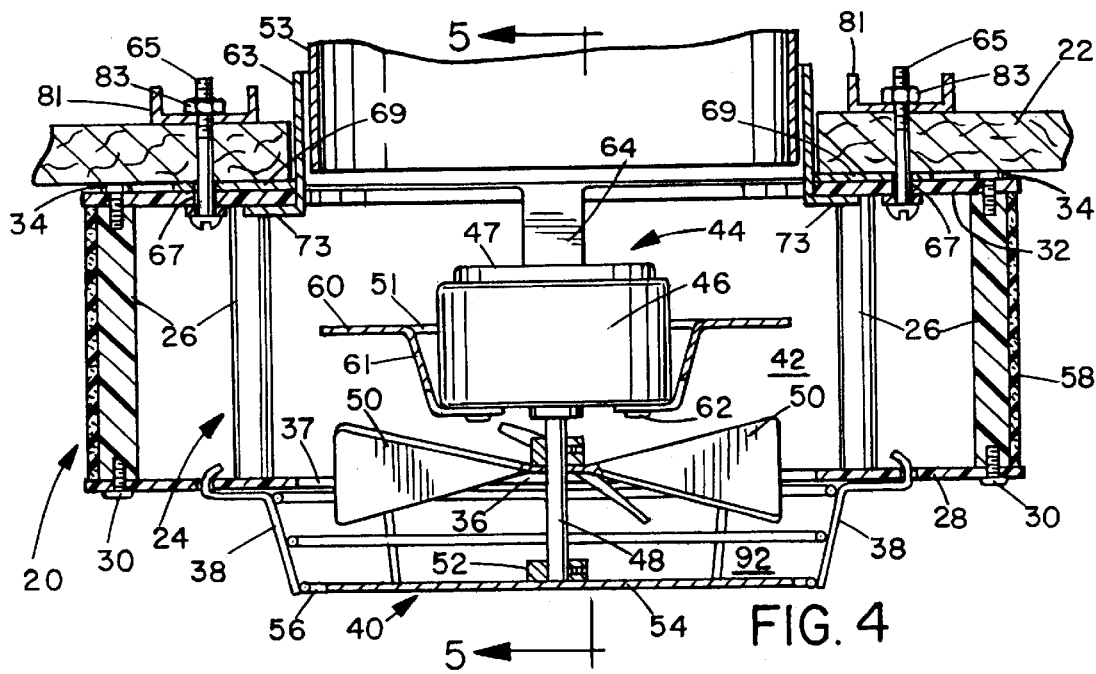
FIG. 4 is an enlarged sectional view taken on Line 4—4 of FIG. 2.

FIGS. 1, 2 and 4 show a device 20 of the present invention, with FIG. 1 showing it in the horizontal orientation as it would be observed by someone standing on the floor when the device is mounted on a ceiling 22. It is formed of an open frame 24 which is made of vertical bars 26 which are attached at their lower ends to a bottom plate 28 by screws 30 and at their upper ends to a mounting plate 32 by screws 34. The bottom plate 28 has a first central aperture 36. Surrounding the aperture 36 and mounted to and below the bottom plate 28 is an annular grille 38. Grille 38 is open on its sides and its annular structure defines a second central aperture 40 at its center. Apertures 36 and 40 are aligned coaxially with fan motor shaft 48.

Within the primary interior space 42 formed by the frame 24, bottom plate 28 and mounting plate 32, is suspended and mounted a motorized fan 44 which has a motor 46 in a housing 47. Motor 46 drives motor shaft 48. Mounted on motor shaft 48 are fan blades 50 which are positioned along the length of the shaft 48 so that the fan blades 50 rotate within the first central aperture 36. The rotation circle of the blades 50 substantially fills aperture 36, with only a narrow clearance annulus 37 between the tips of the blades 50 and the edge of the aperture 36. This insures that little air bypasses the blades 50. Farther out along the shaft 48, at the terminal end 52, is mounted in a thin solid disk 54 which rotates with the fan blades 50 and the motor shaft 48. The length of shaft 48 is such that disk 54 rotates in and substantially fills second central aperture 40, leaving only a narrow clearance annulus 56 around the perimeter of the disk 54 to allow free rotation of the disk 54. The diameter of the disk 54 is about the same as or slightly larger than the diameter of the blades 50.

A porous air filter medium 58 surrounds the open sides of frame 24 such that when air is drawn into space 42 by operation of the fan 44 the air must pass through the medium 58. The filtration medium is preferably in the form of a rectangular strip of medium material of a width equal to the height of the frame 24 and long enough to reach entirely around the frame 24 with a small overlap of its opposite ends at 25. The overlapped ends can then be joined to secure the medium in position, such as by use of pins, a hook-and-loop closure (e.g., Velcro® closure material) or springy compression clips. In a preferred embodiment shown in FIG. 7 each end of the medium strip is covered with a thin protective plastic or fabric band 23. A pair of pins 27 protrude from one of the frame bars 26. Holes aligning with the pins 27 are formed in each end band 23, so that the medium 58 can be hooked through those holes in the band 23 at one end to the pins 27, then stretched around the frame 24 and hooked through the holes in the band 23 at the other end to pins 27, thus retaining the medium 58 in place but providing for easy removal for cleaning or replacement. Passage of air through the medium 58 results in removal of some air contaminants, especially particulate materials, so that they are not re-circulated back into the room. The efficiency of the filter medium 58 will be determined by the effective size of the pores in the medium. A smaller average effective pore size of course traps smaller contaminant particles and increases the amount of particular material which will be removed from the air passing through the medium. However, the smaller pore sizes increase the resistance of the medium 58 to passage of the air and require a higher capacity fan 44 to pull the desired amount of air through the medium 58. The person skilled in the art will be readily able to determine appropriate efficiency level of filter medium 58 for any given installation of the device of this invention, by considering the amount, size and type of contaminant particulate material which may be in the room air, the economical size of fan to be used, and the amount of airflow desired. Conveniently the general average pore size of the filter medium 58 will be comparable to the pore sizes of filter media used in commercial consumer appliance room air filtration units.

Figure 5:
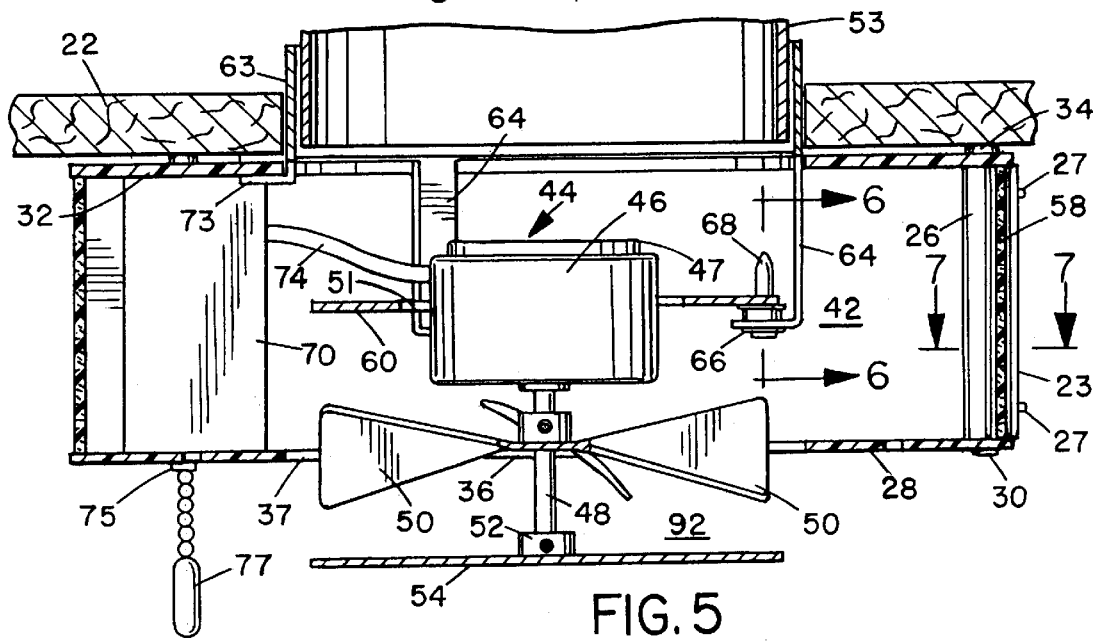
FIG. 5 is a sectional view taken on Line 5—5 of FIG. 4.
Figure 6:
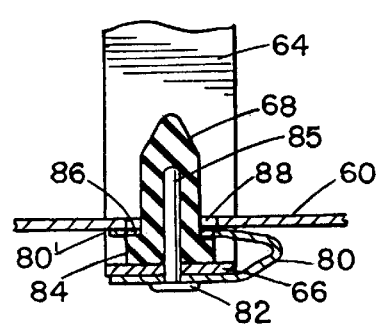
FIG. 6 is an enlarged section view taken on Line 6—6 of FIG. 5.

There are numerous means by which the fan 44 can be mounted within the space 42, including bolting to the frame 24, suspension by bolts or cables from the mounting plate 32 or independent attachment to the wall 22. Those skilled in the art will readily recognize these types of mounting techniques as well as many others. I prefer, however, to have the fan 44 mounted by vertical pins 68 which can also serve as electrical grounds for the fan motor 46. This preferred embodiment is best illustrated in FIGS. 5 and 6. A flange 60 is attached through brackets 61 to fan motor housing 47 by screws or bolts 62 and extends radially outwardly toward brackets 64, each of which is conveniently a narrow strip-like extension of collar 63. Each bracket 64 is L-shaped and has a flat radial bottom portion 66 extending inwardly toward the fan motor 46 and disposed under flange 60 as illustrated in FIG. 5. Mounted vertically and extending upwardly from radial portion 66 of each bracket 64 is a pin 68 which is made of an electrically non-conductive material such as a rubber, an elastomer or a plastic. Rubbers and elastomers are particularly preferred because they are also resilient and thus serve to dampen the fan's vibration.

Figure 3:
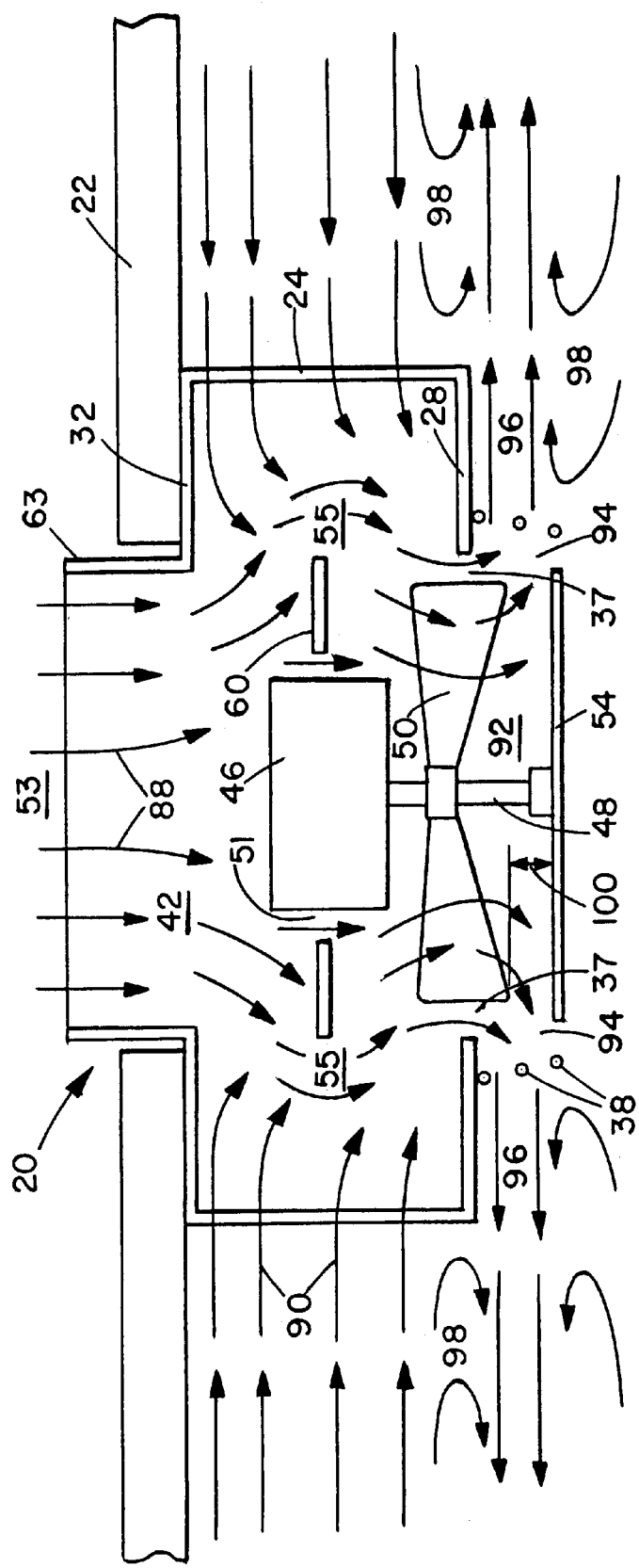
FIG. 3 is a diagram illustrating the airflow pattern through the device.

Flange 60 serves another important purpose, in that it functions as an airflow diverter. Flange 60 is annular and extends entirely around fan housing 47, but is spaced slightly away from the housing 47, leaving a narrow open annulus 51 between in inner edge of the flange 60 and the housing 47. The flange 60 is sufficiently wide that it extends substantially to the outer edge of the downward flow path of the air exiting from the ventilation duct 53, as illustrated in FIG. 3. The flange 60 thus serves to prevent a direct downdraft of air from the vent 53, by causing the downwardly moving air to be forced to flow outwardly and around the outer edge of the flange 60, which also serves to cause the vent air to mix more thoroughly with the incoming ceiling air, as at 55. The annulus 51 is left open so that a small stream of downwardly moving air will pass along the housing 47 and provide cooling to the fan motor 46.

An electrical junction box 70 is mounted within the frame 24. Feed wires (not shown) may be led through a hole (not shown) in ceiling 22 to junction box 70 in a conventional manner. Collar 63 and its extensions brackets 64 are normally made of metal and a ground wire (not shown) in association with the feed wires is brought through the same hole and attached to the some part of the metal collar or bracket with a grounding screw, in a conventional manner. Electrical power for motor 46 is conducted by conduit 74 from a connection within junction box 70. An electrical switch 75 activated by pull chain 77 is present to allow the fan motor 46 to be started or stopped or run at different speeds. Where electrical grounding of the motor 46 or of the entire device is desired or required, this may be accomplished by insertion of a metal clip 80 which is attached to the underside of radial portion 66 of bracket 64 by pin 82 which has an interference fit into hole 85 in mounting pin 68. In a preferred embodiment shown in FIG. 6 the rubber pin 68 has a radially extended lower portion 84 which forms an annular shoulder 86 which supports the re-curved portion 80' of clip 80 and flange 60 when flange 60 is seated over pins 68 through mounting holes 88. The clip 80 is generally U-shaped so that it curves around the radial portion 84 and the recurved portion 80' contacts the underside of fan flange 60. Preferably clip 80 is made of spring metal such as thin gauge steel, brass, aluminum or copper to provide good electrical contact between the flange 60 and the radial portion 66 of bracket 64. Thus if a short circuit occurs in fan motor 46, the fan motor will be grounded through flange 60, clip 80 and bracket 64/collar 63 to the grounding screw and ground wire.

There will optimally be three mounting pins 68 spaced equidistant around flange 60 to provide adequate support for fan 44. Additional pins may be provided if desired, but the three-pin geometry is preferred since, as is well known, additional pins frequently make it difficult to seat the fan properly. A two-pin mounting will be unstable. It is not necessary that each pin have a grounding clip 80 as shown in FIG. 6; generally only one grounded pin is sufficient. It will be noted that in this embodiment fan 44 is not secured to pins 68 by nuts or other fasteners. Rather fan 44 remains in place solely by its own weight acting downwardly against the extended portion 84 of each pin 68. Since commercial fans are normally well balanced, this configuration for mounting the fan is quite stable. In addition, it allows the fan to be easily removed for repair or replacement as necessary.

The entire device is preferably mounted to the ceiling 22 by means of screws 65, which extend through hole 67 in top plate 32 and brackets 69. Brackets 69 are extensions of collar 63. Washers 71 may be used in conjunction with the heads of screws 65 to further secure the device. The collar 63 and brackets 64 are secured to top plate 32 by brackets 69 and brackets 73, which are spaced apart by the width of the top plate 32 and which cooperate to restraint the top plate 32 from moving up or down. Conveniently brackets 69 and 73 are both extensions of collar 63, cut in a fork-tine pattern.

The operation of the device of this invention is best illustrated in FIG. 3. Air 88 flowing from ventilation duct 53 passes downwardly from the ceiling duct toward fan 46 and diverges outwardly into space 42 as described above. Operation of fan blades 50 simultaneously draws the ceiling air 90 laterally into space 42 through filter medium 58. Where the air 88 from the duct diverges outwardly at 55 to pass flange 60, the ceiling air 90 merges with it and curves downwardly toward fan blades 50, thus causing mixture of the ventilation air 88 and the ceiling air 90. The passage of the merged airflows through the blades 50 more thoroughly and effectively mixes the airflows. As the mixed airflows pass out of fan blades 50 into secondary space 92 they contact rotating disk 54 and are diverted radially outwardly as indicated at 94. They flow through the grille 38 in flow direction 96 parallel to the ceiling 22 and opposite in direction to the incoming flow of ceiling air 90. The radially outwardly flow of air 96 causes further mixing and turbulence as indicated at 98. As the air continues to move radially outwardly from the device 20, its flow necessarily expands and speed slows, such that the mixed air disperses gently throughout the room. A high volume of air thus is projected throughout the room, but without the downdraft conditions which are the norm with ceiling ventilating systems and which people find so annoying and uncomfortable. Further, the ability of the devices of this invention to draw stagnant ceiling air layer 90 into the device for mixing and re-dispersion eliminates the presence of a such a ceiling layer and ensures that air throughout the room is adequately and effectively mixed.

The devices of this invention can be manufactured from a variety of different materials. The device may be made of metal or various plastics, or of combinations of such materials. For instance, the frame 24, grille 38 and flange 60 may be made of rigid plastic rods and plates while the fan blades 50 and disk 54 may be made of a softer, shape-retaining rubber, elastomer or plastic (to minimize injury or damage if the blades or disk should strike something during operation). Metal parts will be used where electrical conductivity or enhanced strength is needed, as with the grounding circuit through the flange, pins and brackets. On the other hand, metal should be minimized for devices to be used in environments where there may be flammable or explosive volatile materials or static electricity present. In such cases conventional sealed fan motors will also be preferred. Those skilled in the art will have no difficulty determining the optimum combination of materials for devices of this invention when considered with their intended operating environment.

In order for the device to function at its optimum, the vertical distance 100 between the lower edge of the widest part of each fan blade 50 and the top of disk 54 must be properly sized. If the distance 100 is too large, the air flow at 94 will not flow smoothly in the desired radial direction 96. If the distance 100 is too small, flow of all of the air through the opening at 94 will be impeded. I have found that for a fan with 6"–6½" (15–16 cm) blades (which may conveniently be referred to as a "6-inch" device), the vertical distance 100 should be about 1" (2.5 cm). This provides full air mixing and circulation for about 300–400 ft$^2$ (28–37 m$^2$) of floor area with a 8'–10' (2.4–3.0 m) high ceiling. Thus one device of this invention can adequately provide good air mixing and circulation for a 300–400 ft$^2$ (28–37 m$^2$) room, which typically represents a large single office or a work area for 2–4 people. Larger spaces, such as workshops, restaurant dining rooms and office "bullpen" areas, can be provided with good air mixing and circulation either by having a smaller number of larger devices, or, more preferably, a larger number of devices of the "6-inch" size described. These devices have also been found to have quite acceptable operating sound levels. For instance, a typical "6-inch" device has been found to have a sound level of 53.5 dBA at 1' (30 cm) distance and 44.5 dBA at 6' (180 cm) distance, which are levels consistent with the normal sound level in relatively quiet offices and workspaces.

There are other configurations which also may be used. For instance, grille 38 can be extended downwardly below the position of rotating disk 54 and a downwardly facing cover plate can be attached to the lower extended end of grill 38 to form a decorative cap. This cover plate can also have a safety function, since it can prevent insertion of foreign objects into contact with the rotating disk 54. This can prevent someone from inadvertently contacting disk 54 with his/her fingers and possibly becoming injured.

In another embodiment, an open perforated covering may be placed over the outside of filter medium 58 to provide a decorative appearance. The perforations must be sufficiently large or numerous that the flow of ceiling air 90 into the device is not substantially impeded.

It is also contemplated that the device 20 can be mounted at the outlet of a wall ventilation duct as compared to the illustrated configuration where it is mounted on the ceiling 22 below a ceiling air duct 53. In such a wall configuration, however, it will be necessary to have an appropriate duct extension so that the device maintains its horizontal orientation.

Devices of this invention will find extensive use in homes, apartments, restaurants, office buildings, industrial buildings such as warehouses and machine shops, manufactured housing or buildings and the like. They can be quickly and easily installed, are easily maintained and cleaned, and can be readily removed if necessary. Removal, cleaning or replacement of the air filter medium are all simply accomplished. The devices also are of pleasing appearance, and can be colored to blend with ceiling colors to be visually unobtrusive. Also, as noted above, with good quality fans and normal airflow they have a very acceptable operating sound level.

It will be evident that there are numerous embodiments of this invention which are not expressly described above, but which are clearly within the scope and spirit of the present invention. The above description is therefore intended to be exemplary only, and the actual scope of the invention is to be determined solely from the appended claims.

I claim:

1. An air circulation device comprising:
   an open frame defining a first open space having a top, an open side and a bottom and a second open space below said bottom and having an open side and a bottom, and an aperture through said bottom between said first and said second open spaces;
   a fan motor disposed in said first open space, a motor shaft of said fan motor extending outwardly from said motor through said aperture into said second open space; and fan blades mounted on said shaft at a point intermediate thereof and a disk mounted on said shaft and an end thereof distal to said fan motor;

such that when said motor is activated, said blades and said disk rotate, said blades draw air into said first open space through at least said open side of said first open space and discharge said air through said aperture into said second open space, and said disk in said second open space causes said air to discharge radially from said second space through said side thereof, said discharged air thereby flowing parallel to said air being drawn into said first open space through said side thereof, but in a direction opposite thereto, said device thereby causing mixing and dispersion of said air into ambient space surrounding said device without downdrafts.

2. A device as in claim 1 further comprising a second aperture in said top of said first open space, for entry of air into said first open space other than through said side of said first open space.

3. A device as in claim 2 further comprising said fan blades causing mixing of air entering said first open space through said aperture in said top thereof with said air entering said first open space through said side thereof, and discharging a mixed air stream to said disk for radial discharge through said side of said second open space.

4. A device as in claim 1 further comprising porous air filtration medium removably disposed over at least a portion of said frame, such that said air drawn into said first open space through said side thereof passes through said medium and contaminants are filtered therefrom during passage therethrough.

5. A device as in claim 1 further comprising fastening means for attaching said device to a surface with said top of said first open space adjacent said surface.

6. A device as in claim 5 wherein said surface comprises a ceiling of a room.

7. A device as in claim 2 further comprising fastening means for attaching said device to a surface with said top of said first open space adjacent said surface, said surface having an outlet of an air duct extending therethrough, and wherein said second aperture in said top is aligned with said outlet of said air duct, such that said air entering said first open space through said second aperture comprises air discharged from said outlet of said air duct.

8. A device as in claim 1 further comprising electrical switch means for controlling the operation of said fan motor.

9. An air circulation device for use with an air flow ventilation system, said device comprising:
a frame comprising at least one surrounding side and a bottom, each of said side and said bottom having at least one respective aperture therein for air flow, said side and bottom together defining a first interior;
a grille attached to said bottom around said opening therein and projecting from said bottom outwardly from said first interior, said projection defining a second interior, said grille having at least one aperture in a side thereof for air flow;
a fan disposed in said first interior and supported by said frame, said fan comprising a motor having a motor shaft projecting through said aperture in said bottom and into said second interior, fan blades mounted on said shaft and a solid disk mounted at an end of said shaft distal from said motor;
an airflow diverter disposed across a portion of said first interior; and
a top of said frame comprising securing means for securing said device across an outlet of an air ventilation duct, said top having an opening therein for alignment with said outlet of said duct and providing air passage from said duct into said first interior;

whereby when said motor is operated to rotate said shaft, fan blades and disk, said fan blades draw air from ambient surrounding space through said side of said frame into said first interior, said diverter causes air discharged from said vent and entering said first interior through said aperture in said top to diverge from a straight flow path, said fan blades and diverter thus causing ambient and vent air to intermix, said blades project intermixed air through said aperture in said bottom and against said plate, and rotation of said plate causes substantially all of said intermixed air to be projected radially through said aperture in said side of said grille.

10. An air circulation device as in claim 9 further comprising an air filtration medium covering at least one opening in said side of said frame, such that said air drawn into said first interior by said fan blades passes through said air filtration medium for filtration of contaminants therefrom.

11. An air circulation device as in claim 10 wherein all openings in said side of said frame are covered by said air filtration medium.

12. An air circulation device as in claim 10 wherein said air filtration medium is removably secured to said frame over said at least one opening in said frame, such that said medium can be removed for cleaning or replacement.

13. An air circulation device as in claim 9 further comprising said top of said frame also comprising a projecting collar for projection into said outlet of said duct.

14. An air circulation device as in claim 9 further comprising a plurality of mounting members attached to said frame and disposed within said first interior, and mounting means on said fan cooperating with said mounting members to support said fan within said device.

15. An air circulation device as in claim 14 wherein said mounting members comprising projections, said mounting means comprises a flange members projecting from said motor and having apertures therein through which said projections can project, said projections and said apertures cooperating to support said fan within said first interior.

16. An air circulation device as in claim 15 wherein said projections are resilient and act to dampen vibration of said fan during operation.

17. An air circulation device as in claim 14 wherein said mounting members further comprise means for electrical grounding of said fan.

18. An air circulation device as in claim 9 further comprising means for securing said fan in position across said outlet of said duct.

19. An air circulation device as in claim 18 where said outlet of said duct projects through an opening in a ceiling and said means for securing comprises means for securing said frame to said ceiling surrounding projection of said duct through said ceiling.

20. An air circulation device as in claim 18 where said outlet of said duct projects through an opening in a ceiling and said means for securing comprises means for securing said frame directly to said duct.

21. A device as in claim 9 further comprising electrical switch means for controlling the operation of said fan motor.

22. A device as in claim 21 wherein said electrical switch means is selectable for starting or stopping said fan motor or running said fan motor at a selected one of a plurality of speeds.

* * * * *